UNITED STATES PATENT OFFICE.

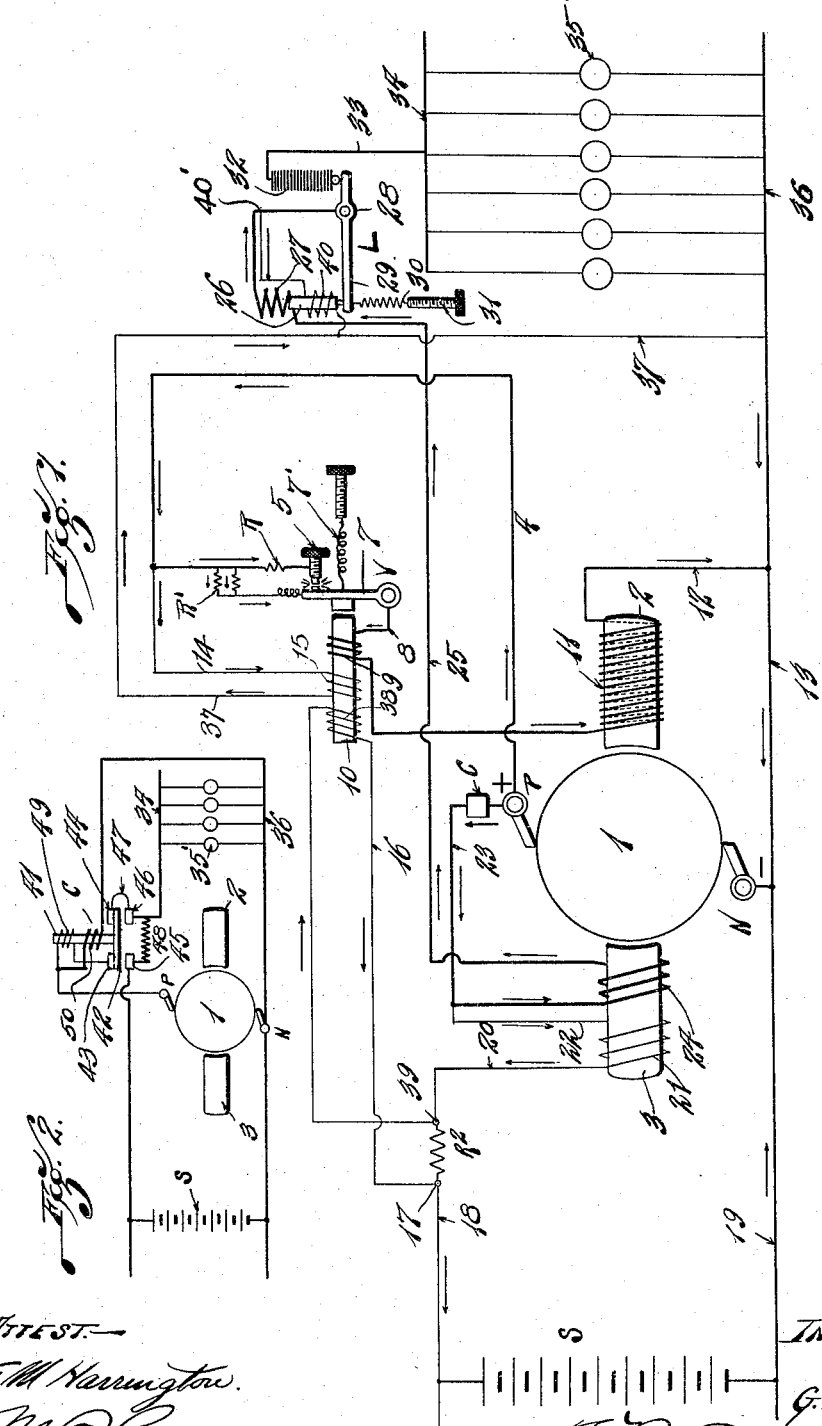

GEORGE SPENCER NEELEY, OF ST. LOUIS, MISSOURI, ASSIGNOR, BY MESNE ASSIGNMENTS, TO GENERAL ELECTRIC COMPANY, A CORPORATION OF NEW YORK.

SYSTEM OF ELECTRICAL DISTRIBUTION.

1,160,749.        Specification of Letters Patent.        Patented Nov. 16, 1915.

Application filed May 15, 1911. Serial No. 627,268.

*To all whom it may concern:*

Be it known that I, GEORGE S. NEELEY, a citizen of the United States, residing at St. Louis, Missouri, have invented a certain new and useful Improvement in a System of Electrical Distribution, of which the following is a full, clear, and exact description, such as will enable others skilled in the art to which it appertains to make and use the same, reference being had to the accompanying drawings, forming part of this specification, in which—

Figure 1 is a diagrammatic view of my improved system. Fig. 2 is a partial diagrammatic view of certain elements in my system showing the automatic cut-out in detail.

This invention relates to a new and useful improvement in a system of electrical distribution, and is adapted for use in connection with direct current dynamos supplying electricity either for light or power, or for the purpose of charging storage batteries.

The invention relates more especially to a means for charging storage batteries in connection with railway car lighting devices, wherein the generator is driven at a variable speed, such as from the car axle. In such systems it is customary to use storage batteries for supplying the lamps or other translating devices with electrical energy, while the car is stopped or is moving at a speed below that sufficient for the generator to do all the work. It is very desirable in practice to supply the lamps or translating devices with a practically constant E. M. F. while at certain times it is desirable to run the generator E. M. F. to 25% or thereabout above the E. M. F. supplied to the lamps and translating devices for the reason that it requires that much more E. M. F. at such times in order to give the batteries their full normal charge. It is also desirable to provide means whereby it is impossible to force current into the batteries beyond their safe maximum charging rate.

The object of my invention is to provide a system of electrical distribution which will conform to the desirable conditions referred to. I make use of a main voltage regulator and an auxiliary or lamp voltage regulator of novel construction which efficiently takes care of the 25% increase of the generator E. M. F. and prevents this excess fluctuation in the E. M. F. from damaging even the most delicate lamps, as well as the usual translating devices such as fans or motors. I also provide an automatic cut-out to prevent the batteries from being charged beyond their safe maximum charging rate.

Referring to Fig. 1 of the drawings: 1 represents the generator armature and 2 and 3 the pole pieces of the field, it being apparent that any number of poles might be used in the field, but for reasons of convenience and simplicity I have illustrated two. These pole pieces are provided with the usual shunt field winding 11, and in addition two series field windings 21 and 24. The circuit of the shunt field winding is as follows: A wire 4 is connected to the positive brush P and is also connected to a contact piece 5 of the voltage regulator V. The current in passing through the wire 4 divides part thereof passing through the resistance R to the contact piece 5, and part through the resistance R' to armature 7 of the voltage regulator V. This resistance R may be made fixed or variable in order that fine adjustments may be more readily made. An armature 7 is arranged to impinge against the contact 5 by means of the usual adjustable spring 7' and is arranged in such relation to the core 10 as to be attracted thereby in opposition to the action of the spring 7'. A wire 8 leads from the armature 7 and forms a coil 9 around the core 10 of the regulator and passes from the coil to the pole piece 2 where it forms a shunt field winding 11 which is connected through a wire 12 to wire 13 leading to the negative brush N of the dynamo. The other portion of the current through the wire 4 passes through a wire 14 and around the core 10 of the regulator V in a coil 15 and passes thence through a wire 37 to the main 13 which forms the negative main. Storage batteries S are connected across the mains 18 and 19, the latter leading to the negative brush N of the dynamo.

The main 18 is connected to a resistance $R^2$ which in turn is connected to the wire 20 passing to a series field winding 21 on one of the pole pieces 3 which coil is connected through wire 22 to a wire 23 passing through the automatic cut-out C connected to the positive brush P. The wire 23 is connected to a second series field coil 24 shown on pole piece 3 which coil is connected to wire 25 which passes around the solenoid core 26 of the auxiliary or lamp voltage regulator L in the shape of a coil 27 which coil is connected to a lever 28 of the lamp regulator. The lever 28 is pivoted intermediate its ends so that one end 29 connects to the solenoid core 26 and the opposite side of this end has a spring 30 connected thereto, said spring being adjustable through the usual screw 31.

Above the end of the lever 28 opposite that to which the solenoid core is connected, is a resistance 32 shown in the form of a carbon pile, which is connected in turn through a wire 33 to one of the mains 34 of the lighting circuit. The lamps or other translating devices 35' are connected in parallel between the mains 34 and 36, the latter being connected to wire 13 and thereby to the negative brush of the dynamo.

The coil 38 on the main regulator magnet 10 forms a shunt circuit around the resistance $R^2$, being connected thereto by wire 16 at points 17 and 39 in the battery circuit. From wire 37 is connected also a shunt coil 40 around the core 26 of the lamp regulator L which coil is connected at its opposite end at a point 40' to the wire connecting the coil 27 to the lever 28.

It will be noted that the lamps 35' and the batteries S are supplied from the generator through individual and independent series field windings 24 and 21. The novel feature of this arrangement is that the current supplied to the batteries S during the interval that they are receiving a charge flowing through the series field winding 21 and the current supplied to the lamps 35 through the other series field winding 24 act differentially. The purpose of this arrangement is to provide a de-magnetizing effect on the series field of the generator in proportion to the intensity of the charging current supplied to the batteries and to produce a magnetizing action through the series field winding 24 by that part of the current supplied to the lamps 35'. The shunt field winding 11 and the series field winding 24 are therefore working in conjunction to build up the strength of the field of the generator, while the series field winding 21 is in opposition to both of the windings 11 and 24 in proportion to the rate of the charging current going into the batteries S. It is obvious, therefore, that as soon as the batteries begin to discharge current, it will have to traverse the series field winding 21 in such a direction that the flux produced thereby will aid that produced by the shunt field winding 11 and the other series field winding 24. This feature in practice causes the generator to build up its E. M. F. very quickly and thereby enable the generator to be connected to the system at a very low speed and with greater despatch than heretofore.

The main voltage regulator V which I have already described is constructed along lines very similar to the one described in United States Letters Patent No. 838,802, but with these differences. In my present construction, I provide a resistance R in series with the contacts which resistance is to cause a "dampening" or retarding effect upon the field current passing in that part of the circuit including the contacts 5 and 7. This resistance causes the armature lever 7 to move more cautiously than it would otherwise do. Furthermore, when the battery S is being charged the currents in all the three windings 9, 15 and 38 on the core 10 in my present regulator V all travel in the same direction, whereas in the afore-mentioned patent the current out-put connected with one of the windings was made to flow in an opposite direction to the currents in the other two windings.

The gap between the parts 5 and 7 constitutes a variable resistance due to the time element entering into the operation of the apparatus, as the period of time during which said parts are in contact affects the mean value of the current flowing through the field circuit by way of the resistance $R'$, and the operation of said contacts 5 and 7 will be regulated in proportion to the mean value of the strength of the magnet 10 and spring 7'. If desired, the parts 5 and 7 may be dispensed with and the well known carbon pile substituted therefor.

By this present arrangement I cause the current in the coil connected in circuit with the shunt field winding of the generator to be assisted by the coil connected in series with the circuit to the batteries and also the coil connected in parallel with the circuit of the translating devices or lamps. This assisting magnetic action on the core 10 is proportional to the current taken into the batteries S when they are on charge, and is effected through the coil 38 shunted around the resistance $R^2$. The effect upon the system of this new arrangement is to intensify the action of the charging current in acting through the regulator V to taper the generator E. M. F. down in proportion as the ampere charging current rises and vice versa. This effect will be apparent when it is considered that the stronger the pull of the magnet 10 the greater its effect in introducing the resistance R' into the field circuit and vice versa. By introducing this additional resistance in circuit with the shunt field winding 11, necessarily the generator E. M. F. will be lowered. Further, the greater the ampere current going into the batteries S on charge, the greater is the demagnetizing effect of the series winding 21 and consequently upon the generator E. M. F. within the predetermined limits. The auxiliary or lamp voltage regulator L acts to change the resistance of the carbon pile 32 which is in circuit with the lamps or translating devices i. e., as the armature of the regulator is moved by the action of the solenoid core 26 to allow the separation of the portions of the pile, the resistance is increased and when the spring 30 overcomes the action of the solenoid core 26 the pile is compressed and the resistance decreased.

The coil 27 controlling the magnetic core 26 of the auxiliary regulator L is connected in series with the lamp 35' whereas the coil 40 is arranged in parallel therewith, but these two coils 27 and 40 are arranged to act differentially. The current in the series coil 27 is intended to neutralize the action of the current in the coil 40 which arrangement brings about a differential action between the pull of the core 26 and the tension of the spring 30, whereby the E. M. F. across the lamp circuit is regulated to a nicety, and always in proportion to the current consumed in the lamp circuit.

In Fig. 2 is a diagram of the generator, the armature 1, poles 2 and 3, storage batteries S, and translating devices 35' connected with the positive and negative brushes P and N of the armature in the same manner as in Fig. 1. I have also illustrated the cut-out C in detail, it being understood that this cut-out as now to be described is the same in all respects as that indicated by a similar letter in the system shown in Fig. 1. The cut-out C is arranged with a core 41 connected with a contact bar 42. This latter bar is arranged to connect opposite contact pieces 43 and 44 or 45 and 46, the contact pieces or blocks 44 and 46 being connected by a wire 47. A resistance 48 is connected across the contact pieces or blocks 45 and 46. Around the core 41 is a series coil 49 connected with the positive brush of the generator and to block 43 and a shunt coil 50 which is connected from the positive brush P to the main 36 of the lamp circuit. The operation of this cut-out is as follows: Assuming the generator E. M. F. to be sufficient to cause core 41 to be magnetically drawn up so that the contact bar 42 will connect with contact pieces 43 and 44, it will be evident that the generator 1 can deliver current to the lamps 35' and the batteries S through the wire 47 where it will divide and part will pass through the fixed resistance 48 to the batteries S. The lamps 35' are free to receive their current through the main 34 connected with the block 46 without passing through the resistance 48. As soon as the generator 1 can no longer deliver an E. M. F. in excess of that of the batteries S, owing to too low speed, the current in the batteries S will begin to discharge slightly until the reverse current in the series winding 49 causes the contact bar 42 to drop down disconnecting the blocks 43 and 44 and therefore the generator 1 from the system. Automatically, by the dropping of the contact bar 42 the contact points 45 and 46 are connected which will form a shunt to the resistance 48 and nullify the effect thereof during the interval that the batteries are called upon to supply the system. Obviously, it is of importance to cut out the resistance 48 during this operation, as the function of this resistance 48 is to protect the batteries against an excess charging rate of current when their internal condition is such that it would be injurious to connect them across the terminals of the generator at the normal working voltage of the lamps 35'.

Having described my system and the parts thereof, I will now explain the operation whereby the ultimate regulation of the E. M. F. supplied to the lamps and translating devices is kept at a constant value.

Assuming, for the sake of an easy illustration, that the usual 32 volt lamp and 16 cell system is shown in the drawings, wherein it will require a maximum of 42 volts on the part of the generator 1 to fully charge the batteries S to their economical working condition. From this it is clear that the working range of from 32 to 42 volts will be required at the terminals of the generator and the lamps 35' take only 32 volts of this maximum amount. To adjust our instruments for this condition, the cut out C should be blocked in such a manner that no current can pass between the generator 1 and the batteries S. The tension of the regulator spring 7' on the main voltage regulator is now tightened until the opposing action of the core 10 and the spring 7' are sufficient to make the effects of the variable resistance across the contacts 5 and 7 and the constant resistance R' of such degree that the E. M. F. across the brushes P and N will be at a maximum of 42 volts. As long as no current is admitted into the batteries, the main regulator V will maintain the generator E. M. F. steadily at 42 volts. The auxiliary lamp voltage regulator L is now adjusted by tightening the tension of the spring 30 until the resistance 32 is of such effect that the E. M. F. across the lamp circuit 34 and 36 is 32 volts. With the generator 1 delivering 42 volts at its brushes P and N and the auxiliary regulator L adjusted to cut this E. M. F. down to 32 volts before it reaches the terminals of the lamps, it will then be seen that the generator is delivering its minimum of current. The cut-out C is now unblocked, the batteries are assumed to be in such condition that they will take their maximum rate of charging current which in this instance is 40 amperes and it should be noted that the batteries would absorb a current rate much in excess of 40 amperes if it were not for the retarding effect of the resistance 48, while the generator E. M. F. was at a maximum. The 40 amperes charging current passing through the series field winding 21 will produce a flux opposing that produced by the shunt field current in winding 11 thus instantly causes the generator voltage across the brushes P and N to drop to the minimum of 32 volts E. M. F. and this condition will remain as long as the rate of charging current remains at 40 amperes. As the batteries approach their full charge, their counter E. M. F. causes them to take less charging current which has the effect of removing in proportion the de-magnetizing effects upon the series field of the generator and externally through the action of the main voltage regulator V.

When the lamp load 35' is added to the system, if it be assumed that the current required is 20 amperes, at the instant the lamps are thrown on the system and the E. M. F. of the generator 1 to be anywhere between 32 and 42 volts depending entirely upon the ampere rate of charging current going into the batteries S, the effect will be two fold. First, the main voltage regulator magnet 10 is weakened by a dropping in the potential E. M. F. across the brushes P and N of the generator 1 when the spring 7' which now preponderates instantly causes the lever 7 to be drawn toward the contact 5 cuts down the effect of resistance R' until the shunt field current has reached a value where the pull of the magnet core 10 is again at the same strength as it was before the 20 ampere lamp load was added to the system. The E. M. F. across the brushes P and N of the generator will be found to be exactly the same value as it was at the instant the lamp load was added to the system. The second effect is felt upon the generator by means of the 20 ampere current supply to the lamp load traversing the series winding 24 in a direction so as to add its effect to that in the shunt field winding 11. This part of the system acts in the same manner as the well known "compound winding" of direct current generators with this difference: In my present system the main voltage magnet 10 acts automatically the very instant there is a diminution in the generator E. M. F., while the auxiliary lamp voltage regulator magnet 26 acts simultaneously with the main voltage regulator to preserve an evenly regulated E. M. F. across the lamp terminals from two sources i. e. the shunt coil 40 and the series coil 27 are in opposition so that with an increasing current consumption in the lamp circuit, the natural drop in E. M. F. is felt first in the shunt coil and this action is intensified on the solenoid core 26 by the increasing current in the series winding 27, thus a double differential action is brought to bear on the core 26 and in such a manner as to intensify the action of the spring 30 in making the resistance 32 more or less effective as the case may be in preserving constant potential or E. M. F. across the lamp circuit. A decrease of generator speed has a corresponding decreasing effect upon the E. M. F. across the brushes of the generator, which reduction in E. M. F. is also felt across the shunt windings of both the main and auxiliary voltage regulators V and L, in such a manner as to reduce the regulating resistance over which each regulator presides at the same ratio as the speed is reducing, thereby automatically preserving a constant potential or E. M. F. on the system according to the demands of the batteries or translating devices, until the critical minimum speed is reached where the generator is automatically switched out of the system and the batteries switched into the circuit. The operation is reversed upon an increasing speed.

In case a regulation for constant current were desired, the regulator V could be dispensed with as the two windings 21 and 24 can be proportioned so that any increase of speed will force currents in opposite directions through these respective windings, and in such manner the field flux is held at its proper value regardless of speeds.

It is to be understood that the novel form of automatic regulators as well as the form of cut out as described may be used in other systems and in different arrangements without change. I am also aware that minor changes may be made in the construction, arrangement and combination of the various elements forming my improved system without departing from the spirit of my invention, the scope of which is indicated in the accompanying claims.

What I claim is:

1. A system of electrical distribution, comprising an electric generator having a shunt and two series field windings, a storage battery, one of said series windings being adapted to supply current to said storage battery in an opposite direction to the currents flowing in the other series winding and the shunt field winding, substantially as described.

2. A system of electrical distribution comprising in combination a generator having two auxiliary field windings and a shunt field winding, a load circuit and a battery circuit, the load circuit being connected to one of said auxiliary field windings and the battery circuit being connected to the other auxiliary field winding, said auxiliary field windings being arranged differentially, and a main voltage regulator controlling a variable resistance in circuit with the shunt field winding of the generator.

3. A system of electrical distribution comprising a generator having a shunt field winding and two series field windings, the latter being arranged to electrically oppose each other, a storage battery in circuit with one of the said series windings, and a voltage regulator controlling a variable resistance in circuit with the shunt field winding.

4. A system of electrical distribution in combination with a dynamo electric machine having a shunt field winding, and two series field windings, a main voltage regulator comprising a core having a plurality of windings thereon adapted to act cumulatively, a relatively fixed resistance and means for producing a variable resistance in circuit with the shunt field winding of the machine, and one of said regulator windings, and a constant resistance acting as a shunt to the said relatively fixed resistance and the said means for producing a variable resistance.

5. A system of electrical distribution comprising in combination an electric generator having a shunt field winding and two series field windings, one of said series field windings being arranged differentially to the shunt and the other series field winding, a battery circuit, a voltage regulator adapted to control a resistance in circuit with the shunt field winding, said regulator comprising a control magnet having three windings, a storage battery in series with said differentially arranged series field windings, one winding on the voltage regulator being arranged to be energized in proportion to the current in said battery circuit, a second winding on the regulator being connected in series with the shunt field winding, and the third winding on the regulator being connected across the brushes of the machine, the three windings on the voltage regulator being arranged to act cumulatively.

6. In a system of distribution, the combination with a storage battery, of a dynamo-electric machine provided with a shunt field winding and with a series field winding, said machine being also provided with a differential series field winding arranged to be excited with a current proportional to that supplied by said machine to said battery.

7. In a system of distribution, the combination with a storage battery, of a dynamo-electric machine provided with a shunt field winding and with a series field winding acting cumulatively therewith, said machine being also provided with a differential series field winding arranged to be excited with a current proportional to that supplied by said machine to said battery.

8. In combination, a dynamo-electric machine having a shunt field winding, a voltage regulator comprising a plurality of windings, a resistance, one winding of said regulator and said resistance being in series with one another and with said shunt field winding, and another resistance, said regulator also comprising means responsive to said windings for intermittently throwing said resistances in parallel.

9. In combination, a dynamo-electric machine having a shunt field winding, a voltage regulator having a plurality of windings, a contact, a movable contact associated therewith and controlled by said windings, a resistance arranged in series with one winding of said regulator, said contacts and said shunt field winding, and another resistance connected in shunt with said resistance and contacts.

In testimony whereof I hereunto affix my signature in the presence of two witnesses, this 12th day of May, 1911.

GEORGE SPENCER NEELEY.

Witnesses:
F. R. CORNWALL,
M. C. SMITH.

Copies of this patent may be obtained for five cents each, by addressing the "Commissioner of Patents, Washington, D. C."